March 24, 1925.                                                1,530,632
J. WATSON
SHOCK ABSORBER
Filed Sept. 5, 1922
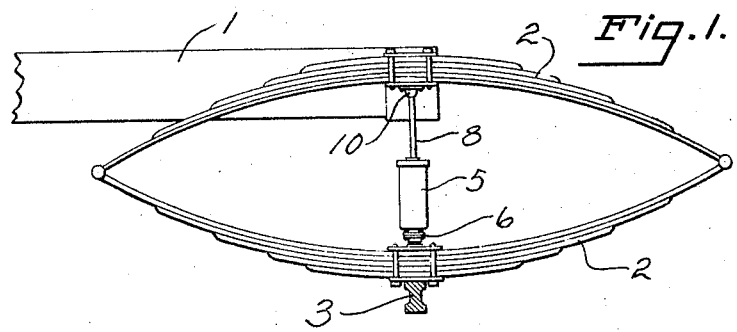
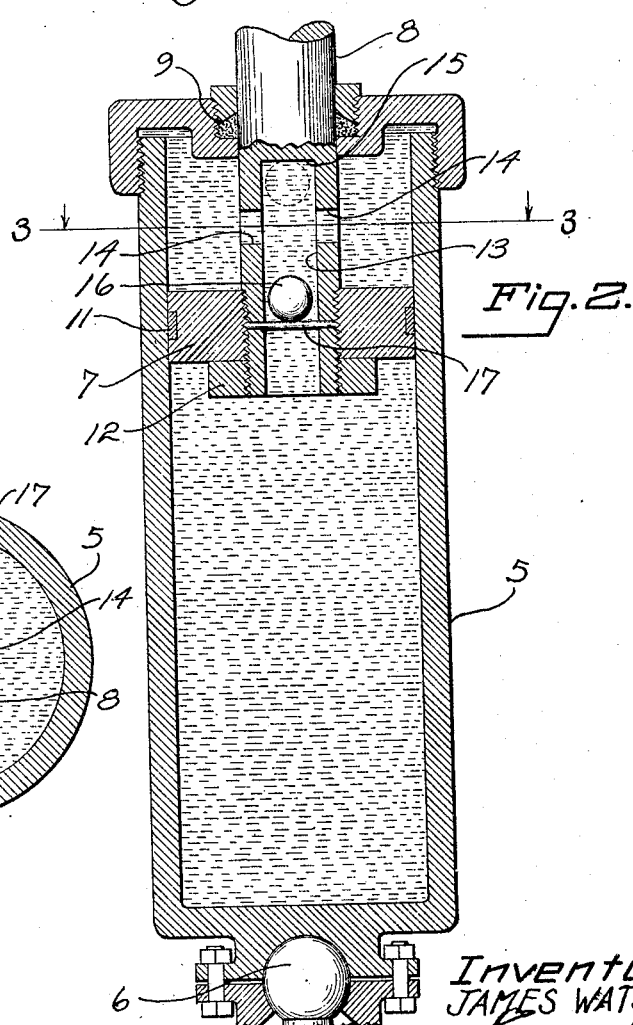
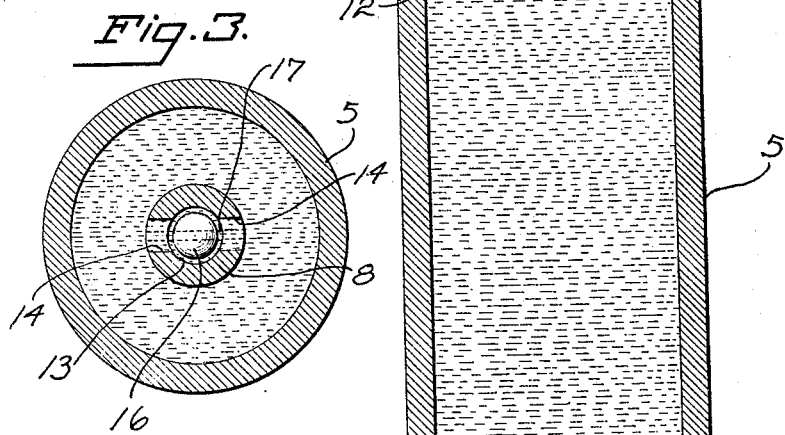
Inventor
JAMES WATSON
Lyon & Lyon
Attorneys Patented Mar. 24, 1925.

1,530,632

UNITED STATES PATENT OFFICE.

JAMES WATSON, OF LOS ANGELES, CALIFORNIA.

SHOCK ABSORBER.

Application filed September 5, 1922. Serial No. 586,060.

*To all whom it may concern:*

Be it known that I, JAMES WATSON, a citizen of the United States, residing at Los Angeles, in the county of Los Angeles and State of California, have invented a new and useful Shock Absorber, of which the following is a specification.

This invention relates to shock absorbers, and is particularly directed to a type of device which may be applied to motor vehicles in a manner to oppose sudden movements of the body with relation to the running gear, to the end that road shocks are absorbed instead of being transmitted to the body.

An object of the invention is to provide a shock absorber to retard or eliminate the free bounding movement of the vehicle wheel without transmitting the shock to the vehicle body.

A further object is the provision of a shock absorber which will effectively prevent the swift and objectionable recoil or rebound of the vehicle springs, but which will allow the springs to gradually and gently regain their position after being compressed.

Another object is to provide a shock absorber of the liquid displacement type in which they are no tight seating valves, or springs, and including a control element consisting of a freely movable body which while regulating the action of the device need not contact the parts with which it cooperates to effect such control.

A further object is to provide a shock absorber which will be neat and attractive in appearance, which will be strong and durable in use, and which has a minimum of moving parts.

Various other objects and advantages will be more fully apparent from the following description of the accompanying drawings, which form a part of this disclosure, and which illustrate a preferred form of embodiment of the invention.

Of the drawings:

Fig. 1 is an elevation of part of an automobile structure and its springs, showing my shock absorber in position.

Fig. 2 is an enlarged central vertical section through the shock absorber.

Fig. 3 is a plan section on line 3—3 of Figure 2.

In the drawings, 1 designates a portion of the automobile frame and 2 designates an elliptic spring, the upper half being connected to the frame 1 and the lower half to the axle 3. It should not be presumed that the device hereinafter described is applicable only to this type of spring, because, in fact, the specific type of spring is not in any way a controlling factor, and any other type would be equally assisted by the device of the present invention.

In practicing my invention I provide a closed cylinder and a piston element working in the cylinder; I also provide a port establishing communication from one side to the other of the piston, together with choking means consisting of a member carried loose in the port, the member being smaller, or of less area than the port and operating to restrict the port during the flow in one direction; in this operation this choking means, in the other direction of flow, moves to a point where the flow through the port is substantially unrestricted.

The shock absorber structure comprises a closed cylinder 5 having a universal connection 6 at its lower end for connection to the medial rigid portion of the lower half of the spring, and a piston element including a piston head 7 slidable within the cylinder and a piston rod 8 extending through a packing box 9 in the wall of the cylinder, the rod being provided at its upper end with a universal connection 10 joining it to the medial rigid portion of the upper half of the spring. While I have shown the shock absorber interposed between the two halves of the spring it will be evident that this is only for the purpose of illustrating one specific installation, it being readily understood that the device may be interposed at other locations between the running gear and the body.

The piston head 7 has a suitable piston ring 11 or other type of packing and the cylinder is filled with liquid, preferably oil. The piston rod 8 is fixed to the piston head, preferably by being screw-threaded therethrough with a lock nut 12 engaging its lower end and clamping the head rigidly in place. I provide the piston with means establishing communication between the ends of the cylinder and operating to permit a relatively free flow of the oil on the downward movement of the vehicle body, but I provide a choking device for causing a restriction of the flow on the up movement of the body. For this purpose the rod has a central port or bore 13 extending upwardly from its lower end beyond the upper side of the piston head 7 and the walls of the rod have transverse openings 14 communicating with said bore and with the cylinder on the upper side of the piston head, the bore 13 and openings 14 forming a permanently open port establishing communication from on side to the other of the piston. The bore 13 extends upwardly beyond the openings 14 to form a pocket extension 15 and positioned within the bore is a choking device in the form of a control ball 16 of a diameter which is less than that of said bore, a transverse pin 17 carried by the rod, preventing the ball 16 from falling out of the bore.

With the mechanism in the position shown in Fig. 2, it will be assumed that the vehicle wheel strikes an obstacle, such as a railroad crossing, for example; the effect of striking the obstacle is to force the axle upwardly and to compress the spring. At the same time the lower end of the cylinder 5 rises towards the piston head 7. This will cause the liquid to force the ball 16 upwardly into the pocket 15 leaving the port entirely unrestricted by the ball. This allows the displacement of the liquid from below the piston head to above the piston head at a speed depending upon the maximum area of the bore 13 and openings 14.

The energy stored in the vehicle springs now expends itself in projecting the vehicle body upwardly, thus reversing the relative movement of the cylinder and plunger. The movement of the plunger is in this instance upward relative to the cylinder and during the first portion of such movement the control ball 16 returns to its normal position to rest on the stop pin 17. The port is now restricted to an area equal to the difference between the diameter of the ball and that of the bore 13, and the flow of the oil through the port from above the piston head 7 is proportionately decreased. In this manner the rebound is absorbed slowly so that the shock occasioned by the obstacle encountered, is not transmitted to the vehicle body.

It is to be noted that the control ball is not required to seat or to engage the walls of the bore in effecting a control of the port, and in this regard cannot be considered as a valve in the ordinary use of the term but rather as a choking means for restricting the return flow of the liquid. Also attention is directed to the simplicity and strength of the construction which has only three moving parts and is entirely devoid of springs.

Having no valve seats or close working parts there is no danger of the device failing to work by reason of impurities or sediment in the oil.

The ball 16 is preferably of a specific gravity slightly greater than the liquid in the cylinder so as to always seek its normal position on the stop pin 17 excepting when forced upwardly by the upward flow of the liquid through the port.

While the form of device herein illustrated and described is well adapted to fulfil the objects primarily stated, it is to be understood that the invention is not to be limited in this regard, for it is susceptible of embodiment in various other forms, all coming within the scope of the following claims.

I claim:

1. A shock absorber comprising a closed cylinder, a piston element in the cylinder and having a permanently open port establishing communication from one side to the other of the piston, and choking means consisting of a member carried loose in the port, of less area than the port, operating to restrict said port during the flow of the contents of the cylinder through it in one direction and automatically movable by the flow of said contents in a reverse direction to a position permitting an unrestricted flow through the port.

2. A shock absorber comprising a closed cylinder, a piston element in the cylinder and having a permanently open port establishing communication from one side to the other of the piston, said port having a pocket extension, and a control element restricting said port during the flow of the contents of the cylinder through said port in one direction and automatically movable into the pocket extension by the flow of said contents in a reverse direction to permit an unrestricted flow through the port.

3. A shock absorber comprising a closed cylinder, a piston element in the cylinder and having a permanently open port establishing communication from one side to the other of the piston, and a choking means in the form of a ball carried loose in the port, operating to restrict said port during the flow of the contents of the cylinder through said port in one direction and automatically movable by the flow of said contents in a reverse direction to permit an unrestricted flow through the port, said control means having a greater specific gravity than said cylinder contents.

4. A shock absorber comprising a closed cylinder, a piston element in the cylinder and having a permanently open port establishing communication from one side to the other of the piston, said port having a pocket extension, and a control ball in the port restricting said port during the flow of the contents of the cylinder through said port in one direction and automatically movable into said pocket extension by the flow of said contents in a reverse direction 5. A shock absorber comprising a closed cylinder, a piston element in the cylinder and including a piston rod extending through the cylinder wall, the piston element having a permanently open axial port extending from one side of the piston upwardly into the rod and communicating with the cylinder on the opposite side of the piston, said port having a pocket extension, and a control member in the port restricting said port during the flow of the cylinder contents through said port in one direction and automatically movable into said pocket by the flow of said contents in a reverse direction to permit an unrestricted flow through the port.

6. A shock absorber comprising a closed cylinder, a piston element in the cylinder and including a piston head and a piston rod extending through and attached to said head and extending through the wall of the cylinder, said rod having a permanently open axial bore extending upwardly from the lower end of the rod on one side of the piston head and transverse openings communicating with said bore and with the cylinder on the upper side of the piston head, said openings having a combined area equal to the area of the bore, and the bore extending above said openings to provide a pocket extension, a control ball in the bore restricting the flow of the cylinder contents from the upper to the lower sides of the piston head and automatically movable into said pocket to permit an unrestricted reverse flow of said contents, and means preventing said ball from dropping from said bore.

Signed at Los Angeles, Calif., this 19th day of August 1922.

JAMES WATSON.